United States Patent [19]
Pare'

[11] Patent Number: 5,794,492
[45] Date of Patent: Aug. 18, 1998

[54] PARKING BRAKE USABLE AS EMERGENCY BRAKE

[75] Inventor: Thomas Edward Pare', Romulus, Mich.

[73] Assignee: Dura Automotive Systems, Inc., Rochester Hills, Mich.

[21] Appl. No.: 607,785

[22] Filed: Feb. 28, 1996

[51] Int. Cl.⁶ ............................ B60T 7/04; G05G 1/14
[52] U.S. Cl. ................................... 74/529; 74/512
[58] Field of Search ...................... 74/529, 530, 531, 74/512; 192/4 A

[56] References Cited

U.S. PATENT DOCUMENTS

| | | | |
|---|---|---|---|
| 3,236,120 | 2/1966 | Fender | 74/531 |
| 3,358,797 | 12/1967 | Walton | 192/4 A |
| 5,029,681 | 7/1991 | Swiatek | |

FOREIGN PATENT DOCUMENTS

| | | | |
|---|---|---|---|
| 4297361 | 10/1992 | Japan | 74/512 |

Primary Examiner—Charles A. Marmor
Assistant Examiner—Mary Ann Battista

Attorney, Agent, or Firm—David A. Greenlee

[57] ABSTRACT

A parking brake actuator comprises a pedal lever mounted on a support bracket for pivotal movement between brake-release and brake-apply positions to release and apply a parking brake. A sector carried by the pedal lever engages a pinion rotatably mounted on the mounting bracket. A torsion clutch spring has one end fixed to the support bracket and a free end, and normally grips and locks the pinion against reverse rotation when the vehicle transmission is in PARK to enable the parking brake to be locked in applied position. A release lever is operable by a bistable solenoid when the transmission selector is moved out of PARK to expand the torsion clutch spring out of engagement with the pinion to prevent locking of the parking brake. A torsion latch spring has legs which embrace the lever in pinion release position and grips a stud with a greater force to block lever movement out of pinion release position after the solenoid is deenergized. This permits the parking brake to be modulated for use as an emergency brake. When the solenoid is reenergized by shifting the transmission selector out of PARK, it moves the release lever out of pinion release position, engaging one spring leg to forcibly rotate the torsion latch spring out of blocking position, which allows the torsion clutch spring to reengage the pinion.

7 Claims, 4 Drawing Sheets

PARKING BRAKE USABLE AS EMERGENCY BRAKE

BACKGROUND OF THE INVENTION

The invention relates to a parking brake actuator is operable to latch the parking brake in applied position when the vehicle transmission is in PARK, and which disables the latch when the transmission is shifted out of PARK to enable modulation of the parking brake for use as an emergency brake during vehicle operation.

Several types of manually operated and foot operated parking brake actuators have been developed for parking brakes. These parking brake actuators use an operating lever which mounts a sector gear that is in constant mesh with a pinion. A torsion spring has one fixed and one free end and grips the pinion hub as a one-way clutch. This allows the pinion to rotate as the operating lever is moved to a brake-apply position, but prevents reverse rotation to latch the lever in the brake-apply position.

The torsion spring free end is engaged by a brake release member to spread the spring and release the pinion hub to unlatch the pinion, which releases the lever for movement to brake-released position. One such parking brake actuator is disclosed in U.S. Pat. No. 3,236,120 to Fender in which the torsion spring is releasable by a vacuum actuator.

This type of parking brake actuator has been modified to disable the pinion latch during vehicle operation so that the parking brake can be modulated for use as an emergency brake. This is accomplished by maintaining the vacuum actuator energized to maintain the latching torsion spring disengaged from the pinion hub when the vehicle is being operated. The operating lever can then be selectively depressed and released to selectively apply the parking brake in an emergency. Since vacuum is terminated when the vehicle engine is not operating, engine shutoff allows the torsion spring to grip the pinion, which enables the parking brake to be latched in any selected applied position.

In many current vehicles, this type of parking brake actuator has been modified to replace the vacuum actuator with an electric actuator. Thus, the electric actuator must be constantly energized to maintain the latching torsion spring in the brake released position to enable use as an emergency brake. However, because newer vehicles have an ever increasing amount of electrical equipment, it is not practical to accommodate the large constant electrical drain required to do this.

It would be desirable to provide a parking brake actuator which utilizes an electrical actuator and which can maintain the latching torsion spring in brake released position to enable use of the parking brake as an emergency brake when the vehicle is being driven, but which allows the torsion spring to move to brake applied position when the vehicle is in PARK for use as a parking brake.

SUMMARY OF THE INVENTION

It is an object of this invention to provide a parking brake actuator control which utilizes an electrical operator and which can maintain the latching torsion spring in brake released position to enable use of the parking brake as an emergency brake when the vehicle is being driven, but which allows the torsion spring to move to brake applied position when the vehicle is in PARK for use as a parking brake.

BRIEF DESCRIPTION OF THE DRAWINGS

These and other objects and advantages of this invention will be more readily understood by reference to the following detailed description with reference to the accompanying drawings wherein.

DESCRIPTION OF A PREFERRED EMBODIMENT

Figure 1:
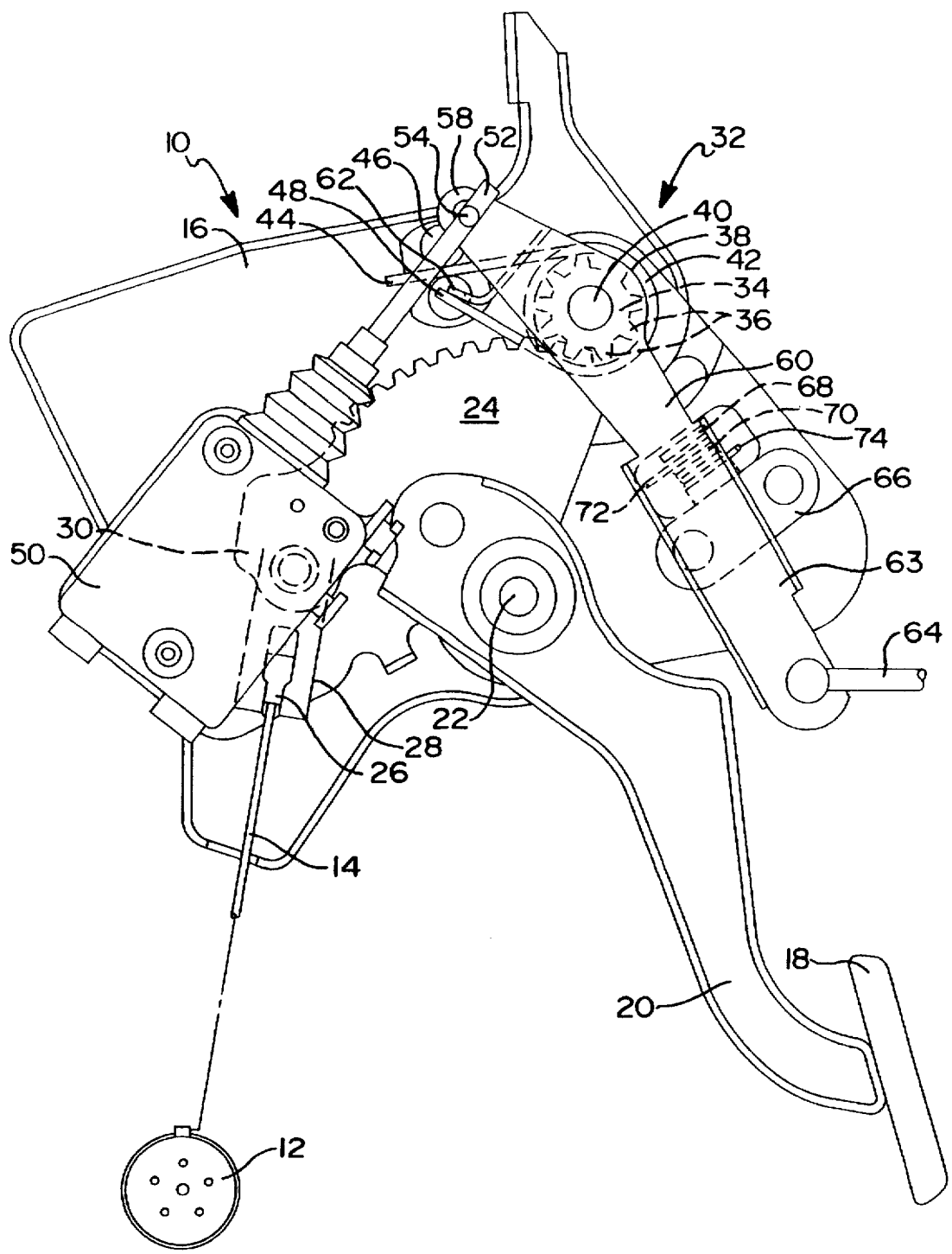
FIG. 1 is a side view of a parking brake actuator incorporating a pedal lever latch mechanism according to this invention.

FIG. 1 shows a parking brake actuator 10 for applying and releasing a vehicle parking brake 12 by pulling and releasing an operating cable 14. Parking brake actuator 10 is mounted on a support bracket 16, that is conventionally mounted beneath the vehicle's instrument panel (not illustrated).

A foot pad 18 is mounted on the free end of an operating pedal lever 20, which has its other end pivoted by a pin 22 to support bracket 16. A gear sector 24 is secured to lever 20 for rotation therewith. The end 26 of cable 14 is secured to a mounting bracket 28 that is mounted on the lower end 30 of sector 24. Depressing of foot pad 18 rotates operating lever 20 clockwise, as viewed in FIG. 1, from the illustrated brake-released position and tensions cable 14 as it applies parking brake 12.

Pedal lever 20 is latched in any brake-applied position by a latch mechanism 32, which features a pinion gear 34 having teeth 36 and an outer hub 38 mounted for rotation on a pivot pin 40. Teeth 36 are in constant mesh with sector 24. A torsion spring 42 has a fixed end 44, secured in a fitting 46 mounted on support bracket 16, and a free end 48.

Torsion spring 42 surrounds and normally grips pinion hub 38 as a one-way clutch, self-expanding to permit counterclockwise rotation of pinion 34, while contracting to prevent clockwise rotation. This permits pedal lever 20 to be freely moved clockwise from the illustrated brake-release position of FIG. 1 to any brake-applied position where contraction of torsion clutch spring latches the pedal lever in that position.

Figure 2:
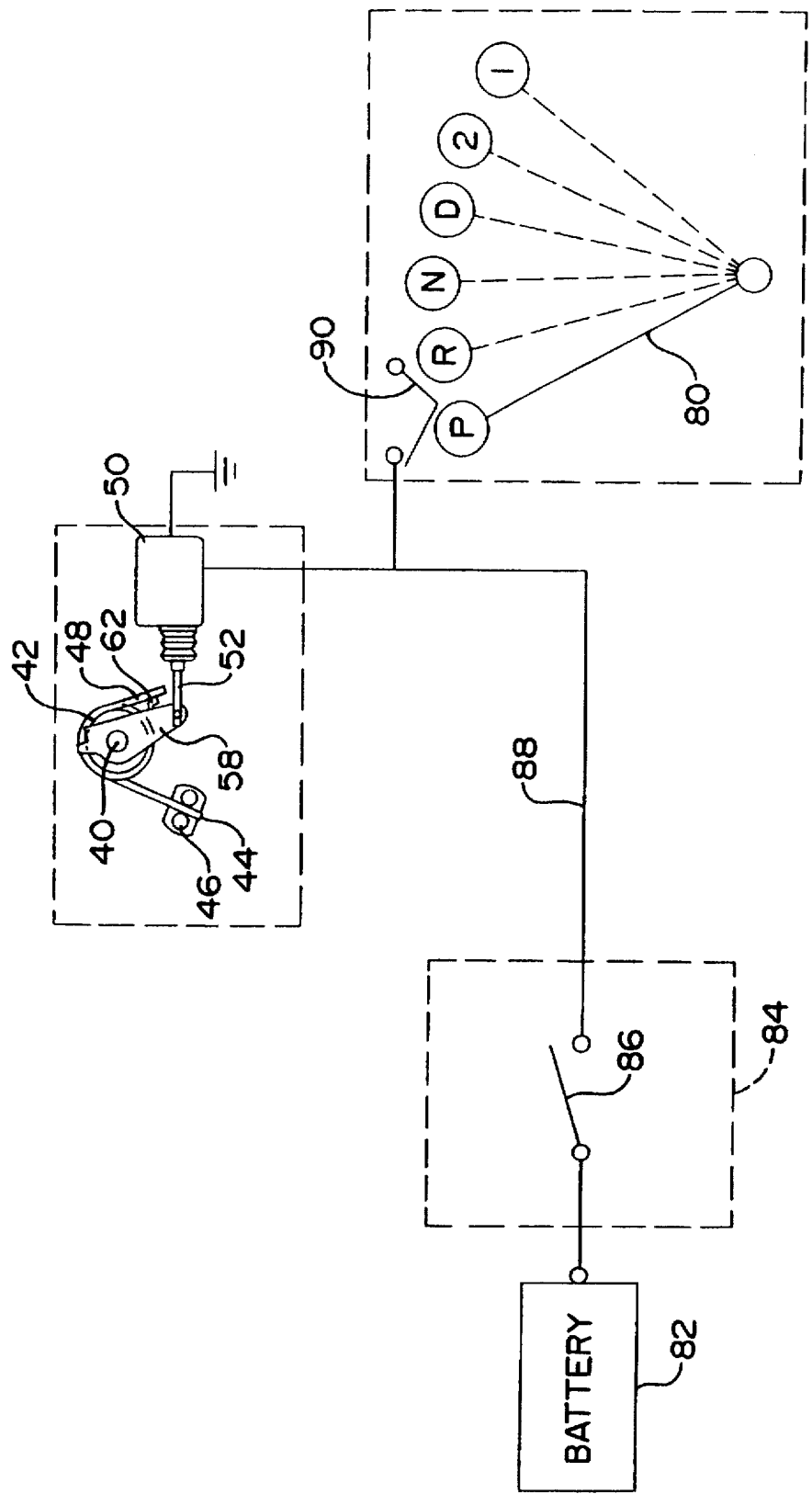
FIG. 2 is an electrical schematic.

Referring additionally to FIG. 2, an electric device in the form of a solenoid 50 is mounted on support bracket 16. Solenoid 50 is a bistable solenoid which is energized to extend and to retract an output arm 52 which is stable in both extended and retracted positions. Output arm 52 has a pin 54 received in a slot 56 formed in the upper end 58 of a release lever 60 that is pivotally mounted on pivot pin 40. A release leg 62 is mounted on lever end 58 for engaging the free end 48 of torsion spring 42.

Solenoid arm 52 is shown extended in FIG. 1. When solenoid 50 is energized to retract arm 52, release leg 62 engages spring free end 48 to expand spring 42, which releases pinion hub 38, allowing cable tension (or a return spring) to return pedal lever 20 to its brake release position.

The lower end 63 of release lever 60 mounts a manual release rod 64 that is connected to a manual lever (not illustrated) for manually operating lever 60. A bracket 66 mounts a stud 68 on mounting bracket 16. A torsion latch spring 70 is mounted on stud 68 and has legs 72 and 74 extending outward at an approximately 45° angle to each other.

Figure 3:
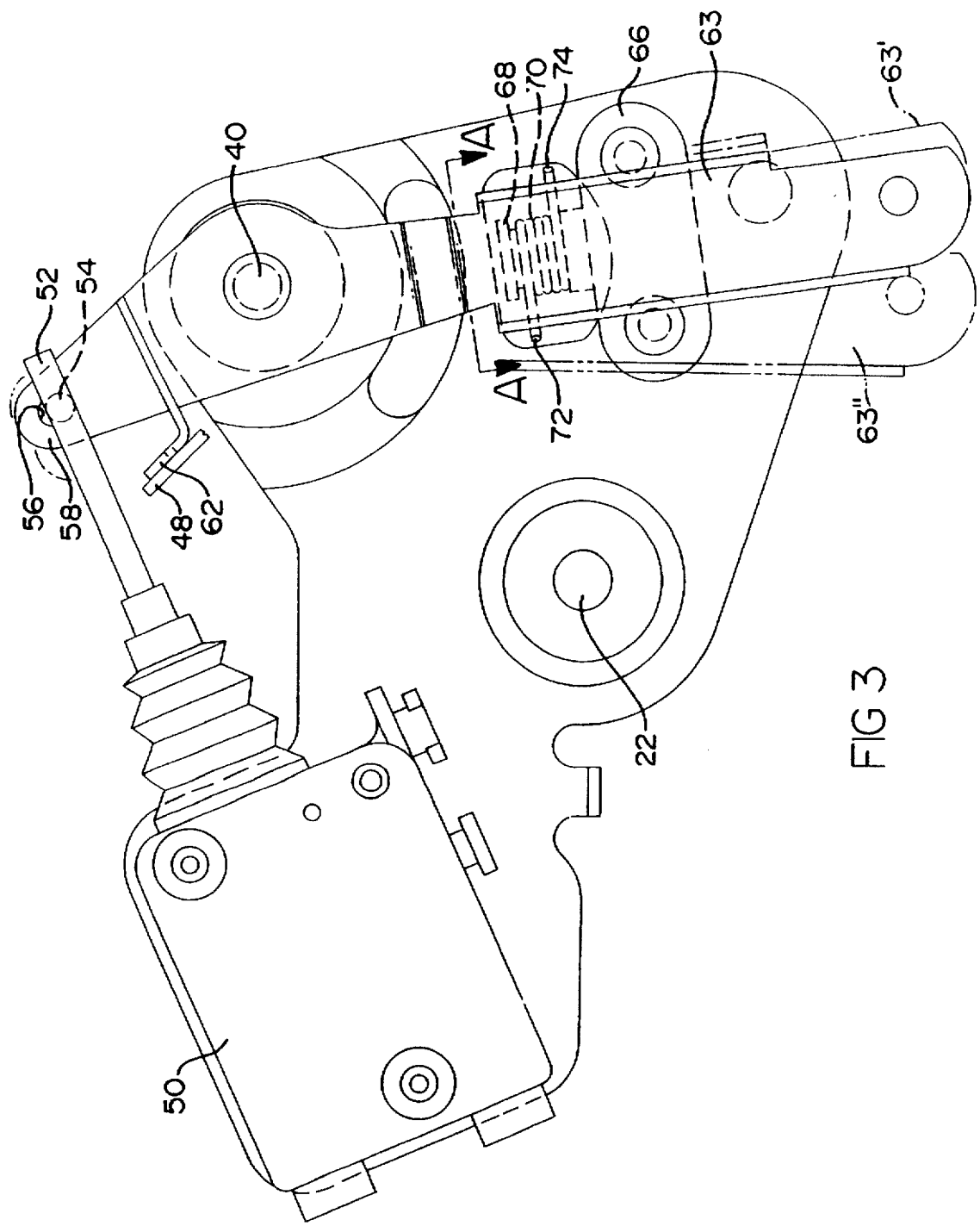
FIG. 3 is an enlarged detail view of a portion of the parking brake actuator of FIG. 1, illustrating the electric actuator, the torsion spring release lever, and the release lever of the pinion clutch control, with the pinion clutch torsion spring removed for clarity.

As shown in FIG. 1, when solenoid 50 is extended and deenergized, spring free end 48 is unrestrained, permitting torsion clutch spring 42 to grip hub 38 and lock pinion 34 against rotation. This position of release lever lower end is denoted 63" as shown in phantom lines in FIG. 3 which corresponds to the FIG. 1 position.

FIG. 2 schematically illustrates the electric circuit which controls operation of solenoid 50. A vehicle transmission selector 80 has the conventional detented gear positions, denoted 1, 2, 3, D(rive), N(eutral), R(everse) and P(ark). A battery 82 supplies power through an ignition 84, having a switch 86 that is closed when the engine is running, through a line 88 to a switch 90 which is normally open, but momentarily closes when transmission selector 80 is shifted into and out of Park.

When switch 86 is closed, closure of switch 90 by movement of transmission selector 80 into Park momentarily energizes bistable solenoid 50 to extend output arm 52 to rotate release lever 60 clockwise. When transmission selector 80 is in Park, switch 90 is opened, deenergizing solenoid 50. When transmission selector 80 is moved out of Park, switch 90 is momentarily closed to energize solenoid 50 to retract output arm 52. After transmission selector 80 is moved to another gear position, switch 90 opens.

Figure 5:
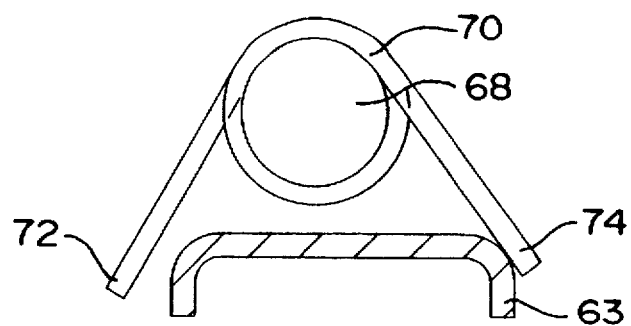
FIG. 5 is a view similar to FIG. 4, showing the release lever position when moved to release position by energization of the electric actuator.
Figure 6:
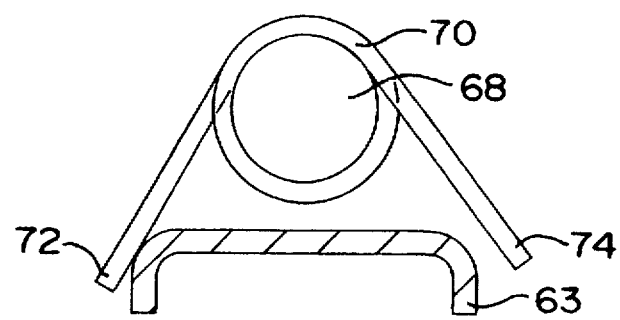
FIG. 6 is a view similar to FIG. 5, showing the release lever position upon deenergization of the electric actuator.
Figure 4:
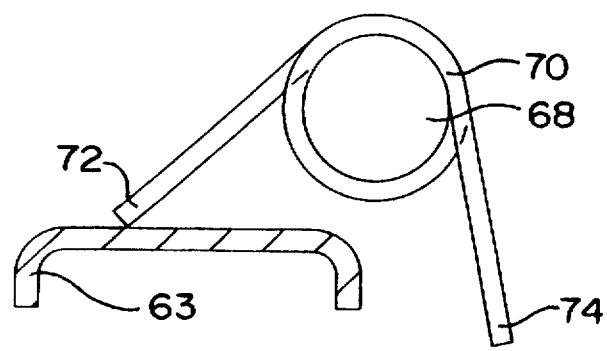
FIG. 4 is an enlarged sectional view, taken along line A—A of FIG. 3 and showing the release lever in latching position.

FIGS. 4, 5 and 6 illustrate the functioning of torsion latch spring 70. Torsion spring 70 grips stud 68 with a frictional force of approximately 4#. When output arm 52 is extended, as in FIG. 1, release lever lower end 63 is in the position of FIG. 4, and as indicated at 63" in phantom lines in FIG. 3.

When solenoid 50 is energized, output arm 52 is retracted to rotate release arm 60 so that release leg 62 engages spring free end 48 to expand torsion clutch spring 42. This causes release lever lower end 63 to engage torsion spring leg 74 and pivot torsion spring 70 on stud 68 as it is moved with a greater force to the FIG. 5 position. This is illustrated as 63' in FIG. 3. In this position legs 72 and 74 embrace lower end 63, with leg 72 blocking movement of lower end 63 out of this position with a force of 4#.

When solenoid 50 is deenergized, spring free end 48 attempts to contract spring 42, exerting a 2# force on release lever 60, moving lower end 63 against spring leg 72, as shown in FIG. 6. However, this 2# force is less than the 4# gripping force of spring 70. Thus, there is insufficient output force to cause lower end 63 to move spring end 72, and lower end remains confined between legs 72 and 74. This maintains torsion latch spring 70 in the FIG. 6 position, which maintains torsion spring end 48 in pinion released position, so that pedal lever 20 can be moved to any brake-applied position without latching, enabling modulation for use as an emergency brake.

Operation will now be explained with reference to all of FIGS. 1, 2, 3, 4, 5 and 6. When transmission selector 80 is in Park, solenoid output arm 52 is extended, as shown in FIG. 1, rotating release lever 60 to release lower end 63 from torsion latching spring 70, as in FIG. 4. This frees spring arm 48, permitting torsion clutch spring 42 to grip and latch pinion hub 38 against reverse rotation. Pedal lever 20 can now be moved and latched in a brake-applied position for use as a parking brake.

When selector 80 is subsequently shifted out of Park, switch 90 is momentarily closed, energizing solenoid 50 to retract arm 52. This rotates release lever 60 so that release arm 62 engages free end 48 to expand torsion clutch spring 42. Release lever lower end 63 rotates back into the embrace of torsion latch spring 70, as in FIG. 5. Upon deenergization of solenoid 50, lower end 63 moves to the FIG. 6 position, where it is trapped by torsion latch spring 70. This disables torsion clutch spring 42 by holding it in pinion released position. Now pedal lever 20 can be moved to any brake-applied position without latching to modulate application of brake 12 for use as an emergency brake.

While only a preferred embodiment has been illustrated and described, many modifications may be made without departing from the scope of this invention as defined by the following claims.

I claim:

1. A parking brake actuator comprising a pedal lever mounted on a support bracket for pivotal movement between brake-release and brake-apply positions to release and apply a parking brake, a sector carried by the pedal lever, a pinion rotatably mounted on the support bracket in engagement with the sector, a torsion clutch spring having one end fixed to the support bracket and having a free end, the torsion clutch spring normally gripping and locking the pinion against rotation, a release lever, an electric device energizable to operate the release lever to engage and move the torsion clutch spring free and against a predetermined force to a position releasing and unlocking the pinion, and a latch which holds the release lever in pinion releasing position after the electric device is deenergized.

2. A parking brake actuator comprising a pedal lever mounted on a support bracket for pivotal movement between brake-release and brake-apply positions to release and apply a parking brake, a sector carried by the pedal lever, a pinion rotatably mounted on the support bracket in engagement with the sector, a torsion clutch spring having a position normally gripping and locking the pinion against rotation and movable against a predetermined force to a position releasing the pinion for rotation, a release lever, an electric device energizable to move the release lever to engage and move the torsion clutch spring to pinion releasing position, and a latch which blocks movement of the release lever out of pinion releasing position with a second force greater than the predetermined force to maintain the torsion clutch spring in pinion releasing position after the electric device is deenergized.

3. The parking brake actuator of claim 2, wherein the latch comprises a spring member having a leg movable into and out of the path of release lever movement, and the electric device moves the release lever with a third force greater than the second force to move the spring member leg.

4. The parking brake actuator of claim 2, wherein the latch comprises a torsion latch spring having a central portion gripping a stud mounted on the support bracket with said second force, and having a pair of legs embracing the release lever in pinion releasing position, one of the legs being located in the path of release lever movement for engagement by the release lever when moved by the electric device from pinion releasing to pinion locked position to move the one leg out of said path and move the other leg into said path, the other leg being engaged by the release lever when it is moved by the electric device from pinion locked to pinion releasing position to move the other leg out of said path and the one leg back into said path with the legs again embracing the release lever.

5. A parking brake actuator comprising a pedal lever mounted on a support bracket for pivotal movement between brake-release and brake-apply positions to release and apply a parking brake, a sector carried by the pedal lever, a pinion rotatably mounted on the support bracket in engagement with the sector, a torsion clutch spring having one end fixed to the support bracket and having a free end, a release lever operable to move the torsion clutch spring free end against a first spring force between a position normally gripping and locking the pinion against rotation to a position releasing and unlocking the pinion, a torsion latch spring movably mounted on the support bracket which blocks movement of the release lever between positions with a second spring force greater than the first spring force, and an electric device energizable to move the release lever between positions with a third force greater than the second force.

6. The parking brake actuator of claim 5, wherein the support bracket includes a stud mounting the torsion latch spring, which grips the stud with the second spring force.

7. The parking brake actuator of claim 6, wherein the torsion latch spring has first and second legs embracing the release lever in pinion releasing position, the electric device is energizable to move the release lever to engage the first leg to pivot the torsion latch spring on the stud to release the release lever for movement to pinion locking position, and the electric device is energizable to move the release lover to engage and move the second leg to enable lever movement to pinion releasing position thereby pivoting the torsion latch spring so that both of said legs again embrace the release lever to maintain the torsion clutch spring in pinion releasing position when the electric device is denergized.

\* \* \* \* \*